Figure 1:
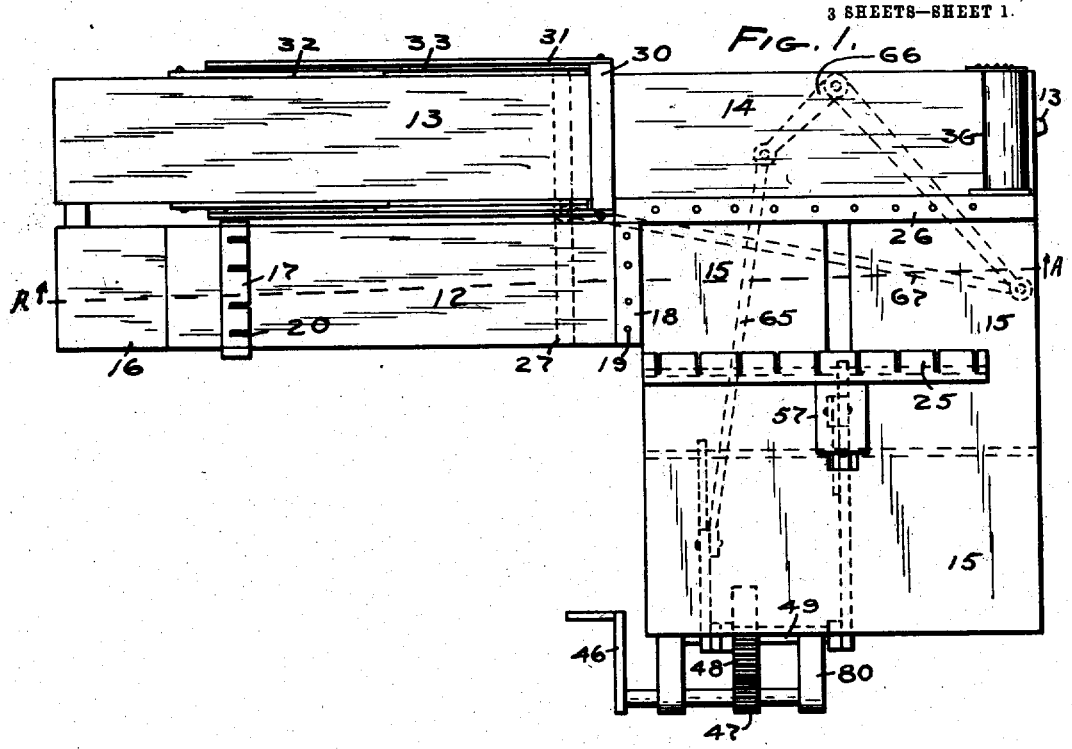

No. 12,100. REISSUED MAR. 17, 1903.

J. J. GAYNOR.

SOAP CUTTER AND SPREADER.

APPLICATION FILED JUNE 11, 1901.

3 SHEETS—SHEET 1.

WITNESSES:
Florence C. Bryant.
Ernest V. Clark.

INVENTOR.
John J. Gaynor.
BY J. H. Lockwood.
His ATTORNEY.

THE NORRIS PETERS CO., PHOTO-LITHO., WASHINGTON, D. C.

No. 12,100. REISSUED MAR. 17, 1903.

J. J. GAYNOR.

SOAP CUTTER AND SPREADER.

APPLICATION FILED JUNE 11, 1901.

3 SHEETS—SHEET 2.

WITNESSES:
G. H. Blake
F. A. Benjamin

INVENTOR.
John J. Gaynor
By
T. H. Lockwood
ATTORNEY.

THE NORRIS PETERS CO., PHOTO-LITHO., WASHINGTON, D. C.

No. 12,100. REISSUED MAR. 17, 1903.

J. J. GAYNOR.

SOAP CUTTER AND SPREADER.

APPLICATION FILED JUNE 11, 1901

3 SHEETS—SHEET 3.

WITNESSES:

G. H. Blaker

F. E. Bryant

INVENTOR.

John J. Gaynor.

BY

V. H. Lockwood

ATTORNEY.

THE NORRIS PETERS CO., PHOTO-LITHO., WASHINGTON, D. C.

UNITED STATES PATENT OFFICE.

JOHN J. GAYNOR, OF INDIANAPOLIS, INDIANA, ASSIGNOR, BY DIRECT AND MESNE ASSIGNMENTS, OF TWO-THIRDS TO FRANK MAUS FAUVRE AND ANTHONY HARMON, OF INDIANAPOLIS, INDIANA.

SOAP CUTTER AND SPREADER.

SPECIFICATION forming part of Reissued Letters Patent No. 12,100, dated March 17, 1903.

Original No. 660,814, dated October 30, 1900. Application for reissue filed June 11, 1901. Serial No. 64,344.

*To all whom it may concern:*

Be it known that I, JOHN J. GAYNOR, of Indianapolis, county of Marion, and State of Indiana, have invented a certain new and useful Soap Cutter and Spreader; and I do hereby declare that the following is a full, clear, and exact description thereof, reference being had to the accompanying drawings, in which like figures refer to like parts.

The object of this invention is to cut and spread bars of soap.

The chief feature of the invention is the means to separate the bars of soap after they have been cut, which, among other things, drops the bars of soap from one table to another table on a lower plane. To aid in this, a stationary and a moving table are employed, one being upon the other, and means are provided to push the soap from the higher one upon the lower one. The moving table moves more rapidly than the header that pushes the soap from one table upon the other. Consequently the soap will be deposited upon the lower of the two tables over a longer surface, whereby they will be separated.

Another feature of my invention consists in a roller to ride upon the soap when it passes from one table to the other, to tip the soap off the higher table to the lower one, and to hold the soap on the lower table while the soap on the higher table is separated from the soap while held stationary under the roller. The arrangement is such that the speed of the roller is greater than the speed of the soap that is moved to it, and therefore greater than the speed of the means that moves the soap toward the roller, and is substantially the same as the speed of the moving table.

Another feature of my invention consists in a stationary and a moving table, a cutter intermediate the two, and means for pushing the soap off one table through the cutter upon the other table.

Another feature consists in a movable table with a cutter mounted at one end and a stationary header over the table, so that said means when the table moves in one direction will cut the soap placed between the header and cutter and deposit it on the lower table, and said moving table in its return movement will push the cut bars of soap out of the way.

Another feature of my invention consists in a stationary table, an adjacent transversely-movable table, a cutter intermediate the two tables, and means for pushing the soap from the stationary table through the cutter upon the transversely-movable table. Also the spreading means is movable transversely of said stationary table, from which the soap is moved while being cut in final form.

The full nature of this invention will be understood from the accompanying drawings and the description following of one form of device embodying said invention, and the scope of the invention will be understood from the claims following said description.

Figure 2:
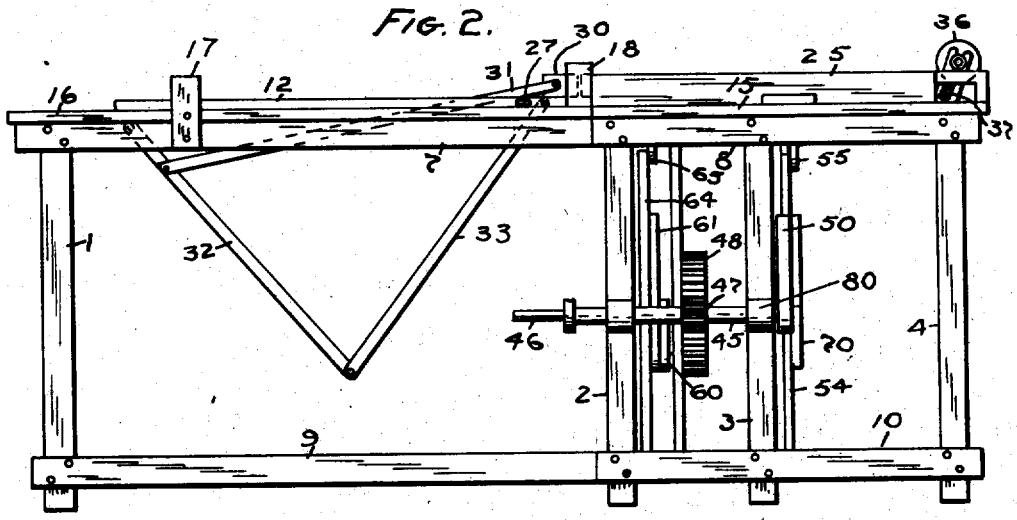
Figure 3:
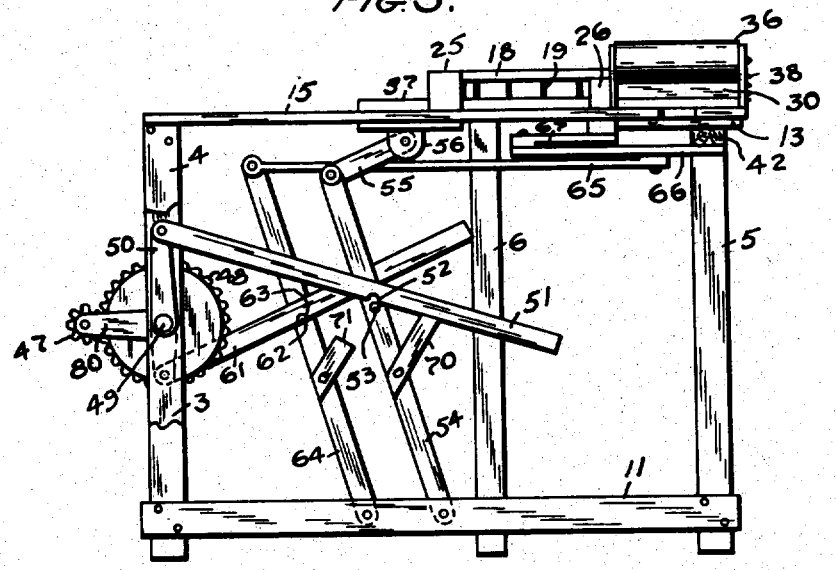
Figure 4:
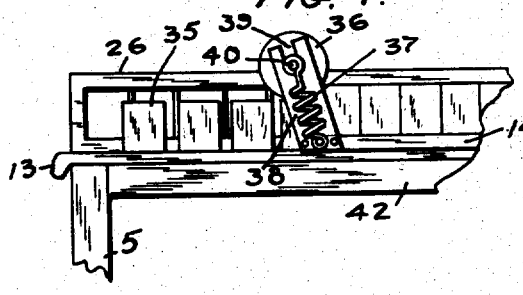
Figure 5:
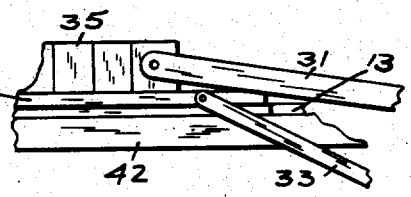
Figure 6:
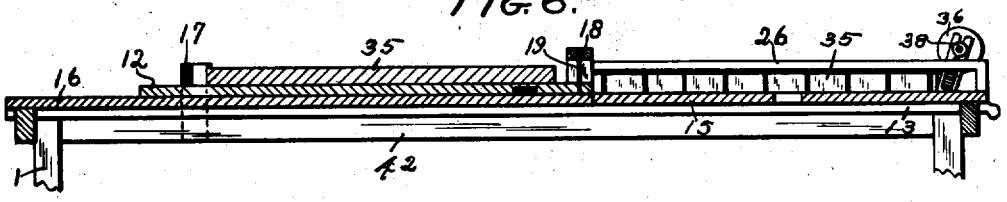
Figure 7:
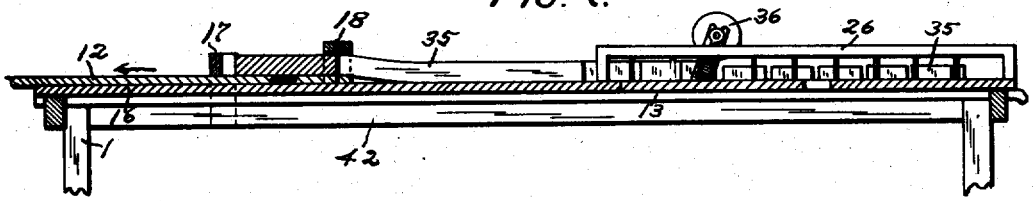
Figure 8:
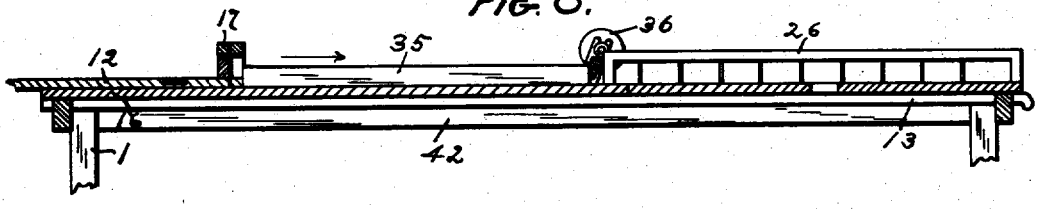
Figure 9:
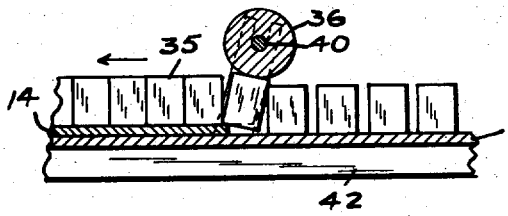
Figure 10:
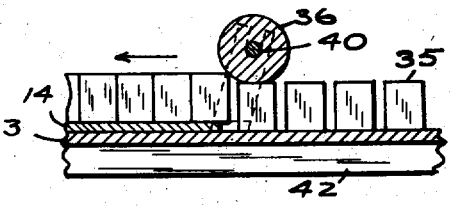

In the drawings, Figure 1 is a plan of the machine. Fig. 2 is a front elevation of it. Fig. 3 is an elevation of the right-hand side, as shown in Fig. 1. Fig. 4 is a detail of the means for separating the bars of soap after being cut, the central part being broken away. Fig. 5 is a continuation of what is shown in Fig. 4, being a side elevation of the central rear portion of the device, parts being broken away. Fig. 6 is a section on the line A A of Fig. 1, showing the parts before the slab of soap has been cut. Fig. 7 is the same, showing the parts while the slab of soap is being cut into long bars. Fig. 8 is the same, showing the parts after the slab of soap has been cut into long bars, and are being pushed upon another table. Fig. 9 is a central vertical longitudinal section through the soap-separating means as a bar is leaving one table in its passage to the other. Fig. 10 is the same, showing the parts just after a bar of soap has passed from one table to the other.

Referring now to the details of the specific device shown merely for the purpose of illustrating the general nature of the invention, 1 is a post, and there is another post (not shown) that is located behind the post 1 as the latter appears in Fig. 2. 2, 3, and 4 are other posts, being located in a row. In addition to these there are other posts 5 and 6 and other similar posts connected by the horizontal bars 7, 8, 9, 10, 11, and 42 and other similar horizontal bars to form a frame to carry the tables. Upon this frame are the tables 12, 13, 14, and 15.

The table 12 is the receiving-table, whereon the slab of soap 35 is originally placed. It is slidably mounted on and over the stationary table 16 by means hereinafter explained. It slides under the stationary header 17 and at its inner end has secured to it a cutter 18, formed as an open rectangular frame provided with the vertical wires 19. Since the cutter is secured to the table 12 when said table is moved to the left, as shown in Figs. 1 and 2, the slab of soap will be held stationary by the stationary header 17, and the movement of the cutter 18 to the left along with the table 12 will cut the slab of soap into long bars lengthwise of the table 12, as appears in Figs. 6, 7, and 8. The header 17 is provided with slots 20 to receive the cutting-wires 19, so that the wires will pass entirely through the slab of soap. While the sliding table 12 is being moved to the left and the slab of soap is being cut into long bars, the long bars issue to the right from the cutter 18, as shown in Fig. 7, and drop on the table 16 below, as shown in Fig. 8. After these long bars are cut by the movement of the cutter to the left the reverse movement of the table 12 pushes them upon the table 15, while the scrap pieces or trimmings on each side will drop down, because they extend laterally beyond the edges of the tables 12 and 16. The movement of the soap after it is placed on the table 15 is at a right angle to its movement on the tables 12 and 16. It is then pushed by the header 25 through the cutter 26 upon the table 14, which for the time is stationary. This cuts the long bars into short bars.

The header 25 is made like the header 20, only the former is movable and the latter stationary, and the cutter 26 is made like the cutter 19, only the former is stationary and the latter is movable.

The table 14 is movable or slidable upon the tray table 13, just as the table 12 is movable and slidable on the table 16. The movements of the tables 12 and 14 are simultaneous, and, as herein shown, they are connected by the cross-bar 27. (Shown in dotted lines in Fig. 1.) It is dovetailed into the under side of the table 12 and into the top of the table 14. Said tables 12 and 14 are driven by the movement of the cross-bar 27, as will be hereinafter explained. The table 13 extends for the full length of the machine—that is, entirely under the table 14.

Assuming now that the bars of soap have been cut and are lying on the movable table 14 and said table is moved to the left, as shown in Fig. 1, the bars of soap will soon engage the header 30, that is mounted on the two bars 31, which are pivoted to the bars 32, as herein shown, at a point one-sixth of the distance from one end, although if it is desired to spread the soap more it is pivoted farther from the pivotal point of the bars 32. Said bars 32 are pivoted to the framework, as here shown to the side bars of the tray-table 13, that are similar to the side bars 7 on the table 16. The side bars of the tray-table 13 being under the edge of said tray-table do not appear in the drawings. Connecting-rods 33 are pivoted at one end to the free ends of the bars 32 and at their other ends are pivoted to the sides or edges of the movable table 14. Therefore the movement of the table 14 transmits motion through the connecting-rods 33 and bars 32 to the bars 31, whereby the header 30 is withdrawn to the left, but with a slower speed than the table 14. As the machine is here shown, the movement of the header 30 to the left will be one-twelfth as fast as the movement of the table 14 to the left.

The result of the movement described in the above paragraph is that the bars of soap are pushed off the right-hand end of the table 14 as it moves to the left and upon the stationary tray-table 13 that is under the table 14. As the bars fall off the right-hand end of the table 14 they are, if not sticky, thereby separated from each other. If the soap is not very adhesive, gravity alone will be sufficient to detach the bars of soap as they come to the edge of the table 14 and cause them separately to fall down upon the table below, as appears in the left-hand end of Fig. 4, where 35 represents the bars of soap. In order to separate the bars of soap when they are adhesive, as is usually the case, a roller 36 is provided, that rides upon the bars of soap and is so mounted as to be held beyond the end of the movable table 14, over the table 13, and is drawn down by a spring 37, so that the downward pressure of the roller on the bars of soap will be sure to separate the bars immediately under the roller from the bars of soap that follow. This roller is held beyond the end of the table 14 by the brackets 38, that are secured on each side of the table 14, quite at its end, and extend at an angle therefrom, as shown in Fig. 4. Said brackets have parallel slots 39 in them, in which the spindle 40 of the roller can move or reciprocate vertically. Said slots 39 are made long enough to give ample scope for the movement of the roller, and, as stated before, the roller is drawn down by the spiral spring 37, which at one end is looped about the spindle 40 and at the other end is secured to the lower part of the bracket 38. On each side of the machine the construction is the same as shown in Fig. 4. The spring 37 is contractile, and therefore tends to draw the roller down on the soap. If the roller is heavy enough, no spring is needed, as gravity would be sufficient. The table 14 terminates behind the bracket 38, as shown in Fig. 4, or between the pair of said brackets 38. With a roller of the size shown, the table 14 terminates substantially in line with the edge of the roller next to the table 14, as shown in Figs.

9 and 10. A smaller roller may be used; but the arrangement should be such that when the bar of soap passes from one table to the other it will be about midway under the roller. The roller being attached to the table 14 it moves with it, as shown in Figs. 5, 6, and 7, for the table 14 is moved by and simultaneously with and in the same direction as the table 12. This roller, as stated, forcibly separates the sticky bars of soap and causes them to be deposited one at a time on the stationary tray-table 13, as shown in Fig. 4. The spreading or separation of the bars of soap, so that they will not touch each other on the tray-table 13, however, is effected by the differential movement of the header 30 and the table 14, as appears in Fig. 4. Since the bars of soap 35 are moved to the right more slowly than the table 14 moves to the left, the bars when dropped on the tray-table 13 must of necessity be separated, as there shown. After the bar of soap passes from one table to the other and is under the roller, as shown in Fig. 10, it is held down on the stationary table 13 by the roller, so that further movement of the table 14 separates the bars of soap remaining on the table 14 from those under the roller. As the roller travels on with the table 14 and the soap is pushed toward the roller the roller first engages the corner of the advancing bar of soap, as appears in Fig. 10, and then rolls upon it, moving upward somewhat. As the table 14 is further moved and the bar of soap pushed it will tip off the end of the table 14 upon the tray-table 13, as shown in Fig. 9, unless the soap is soft. The further movement of the table one way and the soap the other will discharge the tipped bar of soap entirely upon the tray-table 13, as shown in Fig. 10. The tipping of the bar of soap pulls it away from the adjacent bar on the table 14 and separates it; but if the soap is soft, so it will not tip or separate in tipping, it will be separated afterward by the roller holding the bar stationary on the tray-table 13, while the table 14 moves the other bars of soap bodily away from it, as appears in Fig. 10. The table 13, while it is stationary, is preferably made in sections, so that the portion on which the bars of soap are deposited finally and separated may be removed like a tray and another tray replaced, so that the bars of soap can dry before being handled.

The means for moving the header 25, cutter 18, and other parts of the machine herein shown are as follows: A shaft 45 is mounted in suitable bearings secured to the posts 2 and 3. Said shaft is actuated by a crank 46, and through the pinion 47, mounted on said shaft, the gear 48 is driven that is mounted on the crank-shaft 49. On one end of said crank-shaft 49 there is a crank 50, that actuates a bar 51, having a notch 52 in it that by gravity engages a pin 53 on the bar 54, that is pivoted at its lower end to the cross-bar 11 of the frame, and its upper end is connected by the bar 55 to ears 56 on the under side of the sliding block 57, to which the header 25 is secured. In this manner said header is driven. On the other end of the shaft 49 there is another crank 60, that is pivoted to and actuates the bar 61, which has a notch 62, that by gravity engages a pin 63 in the bar 64, which at its lower end is pivoted to the frame-bar 11 and at its upper end is pivoted to the rod 65. This rod 65 is shown in dotted lines in Fig. 1 to be at its other end pivoted to a crank-shaft 66, which is pivoted to the under side of the cross-bar 42, as appears in Fig. 3. The long arm of said crank-shaft 66 is pivoted to the connecting-rod 67. (Shown in Fig. 3 and in dotted lines in Fig. 1.) This connecting-rod is pivoted centrally to the under side of the cross-bar 27, as appears in Fig. 1. The means just described drives the movable tables 12 and 14, as well as the header 30.

The relative order of movement of the various parts is predetermined by the relative position of the cranks 50 and 60 on the shaft 49. In the drawings herein they extend in opposite directions and one operates when the other does not, whereby the two operating means heretofore described alternate, and, secondly, the movement of the header 25 alternates with the movement of the cutter 18 and the table 14. When one is moving, the other is stationary. These parts are rendered stationary by the bars 51 and 61 being thrown out of engagement with the pins 53 and 63, respectively. This disengagement is caused by the arms 70 and 71, that are secured, respectively, to the bars 54 and 64 and whose upper ends engage the bars 51 and 61, respectively, and lift them out of engagement with the corresponding pins.

When the machine is started after a new slab of soap has been placed on the table 12, the means operated by the crank 61 is in operation and continues so until the long bars from this slab of soap are placed on the table 15. This means of operation then ceases, while the other operates to push the long bars from the table 15 to the table 14. Then the header 25 stops operation while the other means again operates, and since the tables 12 and 14 move simultaneously while a slab of soap is being first cut into long bars the bars from the previous slab of soap are being separated and placed on the tray-table 13.

It may be added that it is immaterial which of the tables 12 and 16 is stationary and which is movable, provided that if table 12 be stationary the header would have to be movable. It is equally immaterial which of tables 13 and 14 are stationary and which movable, provided if table 14 is stationary the roller must also be stationary.

What I claim as my invention, and desire to secure by Letters Patent, is—

1. A soap-spreader including a stationary and a moving table, and a stationary header to push the soap from one table to the other.

2. A soap-spreader including a moving table, a stationary table thereunder, and a stationary header to push the soap from the moving table upon the stationary table.

3. A soap-spreader including a stationary table, means for pushing the soap off said table, and a transversely-movable table for receiving the soap therefrom.

4. A soap cutter and spreader including a stationary and a moving table, one lower than the other, means for transferring the soap from one to the other, and a cutter mounted on the moving table.

5. A soap-cutter including a stationary header, a table movable thereunder, and a cutter secured to the movable table.

6. A soap cutter and spreader including a stationary table, a table movable thereon that receives the soap to be cut, a cutter at the end of said moving table, a stationary header, and means to reciprocate the movable table whereby the soap is cut and pushed off the movable table while it goes in one direction and is pushed out of the way by the movable table while it moves in the opposite direction.

7. A soap-spreader including a stationary and a moving table, means for pushing the soap from one table upon the other, and a roller mounted at the end of the table from which the soap is pushed to ride upon the bars of soap and assist in separating them.

8. A soap-spreader including a stationary and a moving table, means for moving bars of soap from one to the other, and a roller to hold the bars of soap immovably.

9. A soap-spreader including a stationary and a moving table, one being over the other, means for pushing the bars of soap from the higher table to the lower one, and a roller for riding upon the bars of soap as they pass from the higher to the lower table.

10. A soap-spreader including a stationary and a moving table, and a roller at the end of the table from which the soap is pushed to roll over the newly-cut soap at a greater speed than the soap is discharged from one table to the other.

11. A soap-spreader including a stationary and a moving table, a header for pushing the soap from one table to the other, and a roller at the end of the table from which the soap is pushed that rolls over the newly-cut soap at a greater speed than the header.

12. A soap-spreader including a stationary and a moving table, a header for pushing the soap from one table to the other, and a roller adapted to roll over the newly-cut soap at substantially the same speed as the moving table.

13. A soap-spreader including a stationary table, another table moving longitudinally of the first, a header moving at a slower speed than the traveling table to push the soap from one table to the other, and a roller adapted to roll over the soap when it changes tables.

14. A soap-spreader including a roller adapted to roll over the soap, and means for mounting said roller that permits it vertical movement.

15. A soap-spreader including a table on which the bars of soap are deposited after being cut, a header for pushing the bars of soap off such table, a tray under the table to receive the bars of soap as they are pushed off the table, and means for moving said table and header in the same direction at a differential speed.

16. A soap-spreader including a movable table for receiving the bars of soap after they have been cut, a tray under said table, a header resting upon said movable table, and a common means for moving said header and table in the same direction so arranged that the movement of the table will be at a greater speed than the movement of the header.

17. A soap-spreader including a table on which the bars of soap are deposited after being cut, a header for pushing the bars of soap off such table, a tray under the table to receive the bars of soap as they are pushed off the table, means for moving two of such parts of the machine in the same direction at a differential speed, and a roller mounted on the end of the table so as to extend over and beyond its end and adapted to rest on the bars of soap as they are moved off said table.

18. A soap-spreader including a table on which the bars of soap are deposited after being cut, a header for pushing the bars of soap off such table, a tray under the table to receive the bars of soap as they are pushed off the table, means for moving two of such parts of the machine in the same direction at a differential speed, a roller mounted on the end of the table so as to extend over and beyond its end and adapted to rest on the bars of soap as they are moved off said table, and springs for drawing said roller downward.

19. A soap-cutting machine including a stationary table, a support for the slab of soap movable on said table, a stationary header that engages one end of the slab of soap and holds it from movement in one direction, a cutter on the other end of the soap-support, means for reciprocating the cutter and soap-support, whereby when they are moved in one direction the soap will be cut into bars and will drop down on the table below and when they are moved in the other direction they push said bars of soap off said table.

20. A soap-cutter including two tables, a support for the slab of soap that is movable on one table, a stationary header for engaging one end of the slab of soap and holding it from movement in one direction, a cutter mounted on the other end of said soap-support, a cutter on the second table mounted at a right angle to the cutter on the first table, a header mounted on the second table parallel to the cutter on said table, and means for moving the soap-support and cutter on the first table and the header on the second table alternately, whereby the soap support and cutter when moved in one direction will cut the soap into bars that will drop down on the table below and on their return movement will push the bars of soap upon the second table between the cutter and header thereof and the further operation of the machine will cause the header on the second table to push the bars of soap through the cutter on said second table.

21. A soap cutter and spreader including a table, a support for the slab of soap movable on said table, a stationary header for holding the slab of soap from movement in one direction, a cutter secured to the soap-support, a second table adjacent to the first, a stationary cutter thereon at a right angle to the cutter on the first table, a header on said second table, a tray adjacent to said second table, a table movable on said tray and adapted to receive the bars of soap as they come from said second table, a header on said movable table, and a common means for actuating the movable soap-support on the first table and the movable table on the tray and a header on the movable table simultaneously in the same direction so that the header will move at a slower speed than the movable table and will actuate the header on the second table alternately with the other movable parts of the machine, whereby while one slab of soap is being cut into long bars the bars from the preceding slab are being separated.

In witness whereof I have hereunto affixed my signature in the presence of the witnesses herein named.

JOHN J. GAYNOR.

Witnesses:
FLORENCE E. BRYANT,
V. H. LOCKWOOD.